(12) United States Patent
Saito et al.

(10) Patent No.: US 10,031,395 B2
(45) Date of Patent: Jul. 24, 2018

(54) OPTICAL MODULATOR

(71) Applicants: FURUKAWA ELECTRIC CO., LTD., Tokyo (JP); FUJITSU OPTICAL COMPONENTS LIMITED, Kawasaki-shi (JP)

(72) Inventors: Yusuke Saito, Tokyo (JP); Takehito Tanaka, Kawasaki (JP)

(73) Assignees: FURUKAWA ELECTRIC CO., LTD., Tokyo (JP); FUJITSU OPTICAL COMPONENTS LIMITED, Kawasaki-shi (JP)

( * ) Notice: Subject to any disclaimer, the term of this patent is extended or adjusted under 35 U.S.C. 154(b) by 0 days.

(21) Appl. No.: 15/416,719

(22) Filed: Jan. 26, 2017

(65) Prior Publication Data
US 2017/0146886 A1 May 25, 2017

Related U.S. Application Data

(63) Continuation of application No. PCT/JP2015/003863, filed on Jul. 31, 2015.

(30) Foreign Application Priority Data

Aug. 4, 2014 (JP) .................. 2014-158846

(51) Int. Cl.
*G02F 1/035* (2006.01)
*G02F 1/225* (2006.01)
(Continued)

(52) U.S. Cl.
CPC ........ *G02F 1/2255* (2013.01); *G02F 1/01708* (2013.01); *G02F 1/2257* (2013.01);
(Continued)

(58) Field of Classification Search
CPC .. G02F 1/2255; G02F 1/01708; G02F 1/2257; G02F 2001/0157; G02F 2001/212; G02F 2201/12; G02F 2203/70
See application file for complete search history.

(56) References Cited

U.S. PATENT DOCUMENTS 9,535,213 B2 * 1/2017 Sugiyama ................ G02B 6/12
9,664,979 B2 * 5/2017 Liao ....................... G02F 1/2255
(Continued)

FOREIGN PATENT DOCUMENTS

JP    6-313621    11/1994
JP    10-142566    5/1998
(Continued)

OTHER PUBLICATIONS

Eiichi Yamada et al., "112-Gb/s InP DP-QPSK Modulator Integrated with a Silica-PLC Polarization Multiplexing Circuit", OFC/NFOEC Postdeadline Papers, PDP5A.9, 2012, 3 Pages.
(Continued)

*Primary Examiner* — Thomas A Hollweg
*Assistant Examiner* — Guy Anderson
(74) *Attorney, Agent, or Firm* — Oblon, McClelland, Maier & Neustadt, L.L.P.

(57) ABSTRACT

The present invention provides an optical modulator, which can be reduced in size with size reduction of an optical waveguide and electric wiring as compared to a conventional optical modulator. An optical modulator according to an embodiment includes a substrate; an optical waveguide provided on the substrate and configured to guide light; a modulation unit formed of part of the optical waveguide and configured to modulate the light; and electric wires provided on the substrate and configured to supply a high-frequency electric signal to the modulation unit. One end portion and another end portion of the optical waveguide are provided
(Continued)

on a first end surface, one end portion of the electric wiring is provided along the first end surface, another end portion of the electric wiring is provided along a second end surface being different from the first end surface.

9 Claims, 4 Drawing Sheets

(51) Int. Cl.
  *G02F 1/017* (2006.01)
  *G02F 1/21* (2006.01)
  *G02F 1/015* (2006.01)

(52) U.S. Cl.
  CPC ............... *G02F 2001/0157* (2013.01); *G02F 2001/212* (2013.01); *G02F 2201/12* (2013.01); *G02F 2203/70* (2013.01)

(56) References Cited

U.S. PATENT DOCUMENTS

| | | | |
|---|---|---|---|
| 2004/0240036 A1 | 12/2004 | Porte et al. | |
| 2008/0118202 A1* | 5/2008 | Kato | G02B 6/12004 385/14 |
| 2011/0142457 A1* | 6/2011 | Betty | G02B 6/30 398/214 |
| 2011/0188799 A1* | 8/2011 | Sugiyama | G02F 1/0123 385/3 |
| 2011/0305253 A1* | 12/2011 | Kobayashi | H01S 5/02284 372/36 |
| 2013/0202312 A1* | 8/2013 | Shen | H04B 10/5053 398/138 |
| 2014/0133794 A1* | 5/2014 | Kono | G02F 1/225 385/3 |
| 2014/0185978 A1* | 7/2014 | Liao | G02F 1/00 385/3 |
| 2015/0293427 A1 | 10/2015 | Goi et al. | |
| 2016/0119057 A1* | 4/2016 | Mekis | H04J 14/02 398/51 |

FOREIGN PATENT DOCUMENTS

| | | |
|---|---|---|
| JP | 11-174254 | 7/1999 |
| JP | 2002-169131 | 6/2002 |
| JP | 2009-198881 | 9/2009 |
| JP | 2009-244812 | 10/2009 |
| JP | 2012-98472 | 5/2012 |
| WO | WO 2014/104309 A1 | 7/2014 |

OTHER PUBLICATIONS

International Search Report dated Oct. 20, 2015 in PCT/JP2015/003863, filed on Jul. 31, 2015 (with English Translation).
Written Opinion dated Oct. 20, 2015 in PCT/JP2015/003863, filed on Jul. 31, 2015.
Masaki Sugiyama et al., "Company Zero-chirp 10Gb/s LiNbO$_3$ Modulator", Technical Report of IEICE, vol. 104. No. 607, OPE2004-202, 2005, pp. 4.

* cited by examiner

OPTICAL MODULATOR

CROSS-REFERENCE TO RELATED APPLICATIONS

This application is a continuation application of International Application No. PCT/JP2015/003863, filed Jul. 31, 2015, which claims the benefit of Japanese Patent Application No. 2014-158846, filed Aug. 4, 2014. The contents of the aforementioned applications are incorporated herein by reference in their entireties.

TECHNICAL FIELD

The present invention relates to an optical modulator, which modulates and outputs an optical signal inputted thereto.

BACKGROUND ART

In order to deal with an increase in Internet traffic in recent years, introduction of digital coherent communication to long distance optical communication has been initiated whereby an increase in capacity of the long distance communication is in progress. Furthermore, application of the digital coherent communication to medium to short distance optical communication is also under consideration. In particular, an optical transceiver for use in the medium to short distance optical communication faces a limitation on an installation space available. According to the CFP2 standard under consideration for the introduction to the medium to short distance optical communication, components of the optical transceiver need to be put into the size of about 80 mm×40 mm. In addition, even smaller standards such as the CFP4 standard are also under consideration. The optical transceiver requires significant reduction in size from the standard in a range of about 130 mm×100 mm to about 180 mm×130 mm conventionally used in the long distance optical communication. To this end, there is a strong demand for reduction in size of an optical modulator which is a component used in the optical transceiver.

As such optical modulators in the optical transceivers for the digital coherent communication, LN (lithium niobate) optical modulators have heretofore been widely used. However, it is difficult to reduce the size of such a LN optical modulator. Hence, the use of a semiconductor optical modulator applying semiconductor such as InP (indium phosphate), which enables further reduction in size, has been devised. Non Patent Document 1 describes a configuration of the semiconductor optical modulator using InP.

CITATION LIST

Patent Document

Patent Document 1: Japanese Patent Application Laid-Open No. 2012-98472

Non Patent Documents

Non Patent Document 1: E. Yamada et al., "112-Gb/s InP DP-QPSK Modulator Integrated with a Silica-PLC Polarization Multiplexing Circuit", OFC/NFOEC Postdeadline Papers, 2012, PDP5A.9

Non Patent Document 2: Masaki Sugiyama et al., "Compact Zero-chirp 10 Gb/s LiNbO$_3$ Modulator", IEICE Tech. Rep., 2005, Vol. 104, No. 607, OPE2004-202, pp. 51-54

SUMMARY OF INVENTION

Technical Problem

The mere application the semiconductor optical modulator to the optical transceiver for the digital coherent communication instead of the LN optical modulator may be inadequate for packing the module within the size required by the CFP2 standard or any other smaller standard. To further reduce the size of the optical modulator, a possible option is to devise a layout of an optical waveguide included in the optical modulator. According to the technique described in Patent Document 1, an optical waveguide in the optical modulator is arranged into a U-shape to reduce the sire of an optical modulator. Meanwhile, according to the technique described in Non Patent Document 2, an optical waveguide in the optical modulator is arranged into an S-shape to reduce the size of an optical modulator.

However, the techniques described in Patent Document 1 and Non Patent Document 2 improve the layout of the optical waveguide on a chip of the optical modulator, but do not consider a layout of electric wiring. Although the size of the optical waveguide can be reduced by use of the semiconductor optical modulator instead of the LN optical modulator, the size of the electric wiring for controlling the modulation remains unchanged. For this reason, the electric wiring occupies a relatively large area of the chip and the largeness of the electric wiring is non-negligible in order to reduce the size of the optical modulator. The electric wiring needs to be laid out while retaining characteristic impedance at 50Ω. Accordingly, there are limitations in structure and width of the electric wiring. Meanwhile, in the electric wiring, a ground line is generally located beside a signal line, and the ground line therefore needs to have certain thickness in order to reduce crosstalk. As a consequence, the electric wiring also needs to be considered in addition to the optical waveguide so as to reduce the size of the optical modulator as a whole.

The present invention has been made in view of the aforementioned problem. An object of the present invention is to provide an optical modulator, which can be reduced in size with size reduction of both an optical waveguide and electric wiring, as compared to a conventional optical modulator.

An aspect of the present invention is an optical modulator including: a substrate; an optical waveguide provided on the substrate and configured to guide the light; a modulation unit formed of part of the optical waveguide and configured to modulate the light; and electric wiring provided on the substrate and configured to supply a high-frequency electric signal to the modulation unit. One end portion and another end portion of the optical waveguide are provided on a first end surface of the substrate, one end portion of the electric wiring is provided along the first end surface, another end portion of the electric wiring is provided along a second end surface of the substrate being different from the first end surface, the optical waveguide includes a first portion extending from the one end portion of the optical waveguide in a direction perpendicular to the first end surface, a second portion extending from the other end portion of the optical waveguide in the direction perpendicular to the first end surface, and a third portion extending between the first portion and the second portion in a direction parallel to the first end surface, and the modulation unit is provided at the third portion.

According to the optical modulator of the present invention, the two end portions of the optical waveguide are provided on the first end surface of the substrate. Moreover, the one end portion of the electric wiring is provided along the first end surface while the other end portion of the electric wiring is provided along the second end surface being different from the first end surface. As a consequence, an electric wire on an input side and an electric wire on a terminal side are located in regions on the substrate which are different from each other. Thus, it is possible to reduce the size of the optical modulator while ensuring thickness and intervals of the electric wires.

DESCRIPTION OF EMBODIMENTS

Figure 1:
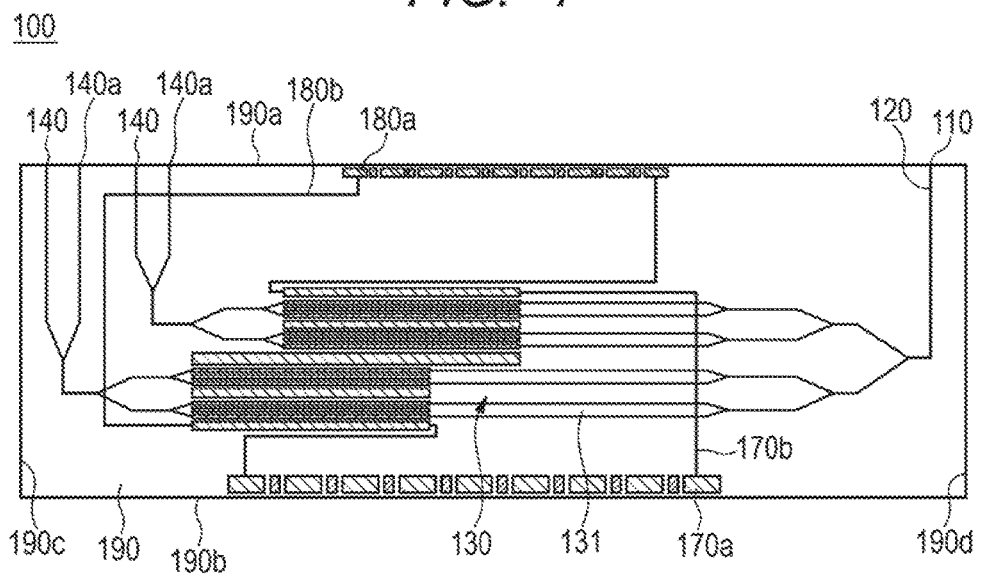
FIG. 1 is a top plan view of an optical modulator according to an embodiment of the present invention.

Embodiments of the present invention will be described below with reference to the drawings. It is to be noted, however, that the present invention is not limited to the embodiments. In the drawings to be described below, constituents having the same functions are denoted by the same reference numerals and repeated description thereof will be omitted as appropriate.

First Embodiment

FIG. 1 is a top plan view of an optical modulator 100 of this embodiment. The optical modulator 100 includes a rectangular substrate 190, and has functions to receive seed light L1 from a laser oscillation unit provided outside the optical modulator 100, and to output modulated signal light L2$a$ and L2$b$. The substrate 190 has a planar structure surrounded by a first end surface 190$a$, a second end surface 190$b$ opposed to the first end surface 190$a$, and a third era surface 190$c$ and a fourth end surface 190$d$ which join the first end surface 190$a$ and the second end surface 190$b$. In this embodiment, a substrate containing InP is used as the substrate 190. Any board that enables formation of an optical waveguide either in the inside or on a surface thereof may be used as the substrate 190 instead.

An optical waveguide 120 is provided on the substrate 190. The optical waveguide 120 is formed either in the inside of or on a surface of the substrate 190 in such a way as to extend along the surface of the substrate 190. An end portion on one side of the optical waveguide 120 is located on the first end surface 190$a$ of the substrate 190 and forms an optical input unit 110, which constitutes a port for inputting the seed light L1. End portions on another side of the optical waveguide 120 are located on the first end surface 190$a$ of the substrate 190 and form signal light output units 140, which constitute ports for outputting the modulated signal light L2$a$ and L2$b$.

A modulation unit 130 includes four Mach-Zehnder interferometers 131 (MZIs), which are formed by branching off and then merging the optical waveguide 120 by use of multiple optical couplers. A configuration of each MZI 131 will be described later. The optical waveguide 120 on an input side (i.e., the optical input unit 110 side) of the modulation unit 130 is branched off into four lines by the two-stage optical couplers, which are connected to an input side of the four MZIs 131. Not-illustrated 90-degree phase shifters are connected to an output side of the two MZIs 131 out of the four MZIs 131. Moreover, one of the MZIs 131 to which the 90-degree phase shifter is connected and one of the MZIs 131 to which the 90-degree phase shifter is not connected are formed into a pair and connected to the optical couplers, thereby being merged into one optical waveguide 120. In this way, two optical waveguides 120 are formed in total and are connected to the different signal light output units 140, respectively. Due to the above-described configuration, signal light subjected to desired modulation by the modulation unit 130 is outputted from the signal light output units 140. Furthermore, additional optical couplers or optical splitters are provided between the MZIs 131 and the signal light output units 140, whereby part of the signal light is branched off by the optical couplers or the optical splitters and is outputted as monitor light for operation monitoring from monitor light output units 140$a$ located on the first end surface 190$a$.

Electric wiring for supplying a high-frequency electric signal to the modulation unit 130 (the MZIs 131) is provided on the substrate 190. The electric wiring is formed of input electric wires 170$b$ on an input side of the high-frequency electric signal, and terminal electric wires 180$b$ on a terminal side of the high-frequency electric signal. Note that a high-frequency wave referred herein has a frequency of 1 GHz or above, for example. An end portion of each input electric wire 170$b$ constitutes an input electrode 170$a$, which is provided in the vicinity of the second end surface 190$b$ and along the second end surface 190$b$. An end portion of each terminal electric wire 180$b$ constitutes a terminal electrode 180$a$, which is provided in the vicinity of the first end surface 190$a$, between the optical input unit 110 and the signal light output units 140, and along the first end surface 190$a$. In other words, the end portions on the terminal side of the electric wiring for supplying the high-frequency electric signal to the modulation unit 130 are provided along the first end surface 190$a$ on which the two ends of the optical waveguide 120 are provided. In addition, the end portions on the input side of the electric wiring are provided along the second end surface 190$b$ which is different from the first end surface 190$a$. Note that that FIG. 1 illustrates only part of the input electric wires 170$b$ and of the terminal electric wires 180$b$ for the sake of visibility. In reality, however, the respective MZIs 131 included in the modulation unit 130 are connected to the corresponding electrodes 170$a$ and 180$a$ through the corresponding electric wires 170$b$ and 180$b$. Each of the input electrodes 170$a$, the input electric wires 170$b$, the terminal electrodes 180$a$, and the terminal electric wires 180$b$ is formed by using any of conductive bodies including gold, copper, aluminum, and the like.

As shown in FIG. 1, the two ends of the optical waveguide 120 included in the optical modulator 100 are provided on the first end surface 190a, and the optical waveguide 120 is laid out so as to form a U-shape in conjunction with the modulation unit 130. In other words, the optical waveguide 120 includes: a first portion extending from the optical input unit 110 in a direction perpendicular to the first end surface 190a; a second portion extending from the signal light output units 140 in the direction perpendicular to the first end surface 190a; and a third portion extending between the first portion and the second portion in a direction parallel to the first end surface 190a. The modulation unit 130 is provided at a curved portion of the U-shape, i.e., at the third portion extending in the direction parallel to the first end surface 190a.

In order for the optical modulator to perform accurate modulation, it is necessary to reduce noises particularly on the input side of the electric wiring. However, the layout of the electric wiring is not taken into account in a conventional optical modulator. On the other hand, in this embodiment, the modulation unit 130 is provided at the curved portion of the U-shape, so that a length of each of the input electric wires 170b can be reduced by arranging the modulation unit 130 in the vicinity of the second end surface 190b where the input electrodes 170a are provided. Thus, it is possible to reduce noise contamination of the electric signals. Moreover, there is also an effect of a small high-frequency wave loss owing to the short electric wires. Furthermore, the terminal electrodes 180a and the terminal electric wires 180b are provided between the two ends of the U shaped optical waveguide 120. In this way, it is possible to reduce a wasted space on the substrate 190 where nothing is arranged. In addition, the input electrodes 170a and the terminal electrodes 180a are provided on the different end surfaces 190a and 190b of the substrate 190. Thus, it is possible to arrange the input electric wires 170b and the terminal electric wires 180b in different regions on the substrate 190, respectively. In this way, it is possible to secure intervals between the input electrodes 170a, between the input electric wires 170b, the terminal electrodes 180a, and the terminal electric wires 180b, and thus to reduce noises to be caused by interference between any adjacent electrodes and between any adjacent electric wires.

Figure 2A:
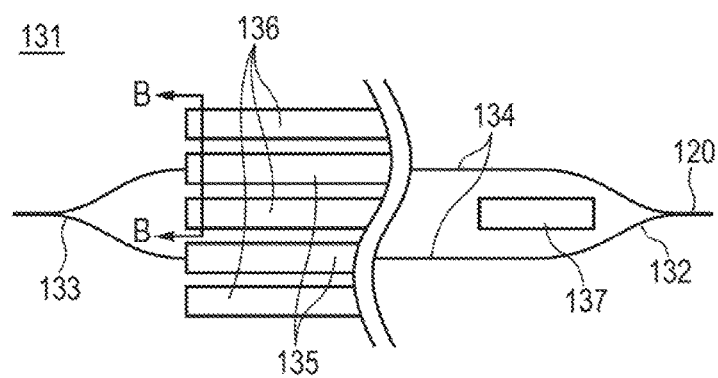
FIG. 2A is a top plan view of a Mach-Zehnder interferometer according to an embodiment of the present invention.

FIG. 2A is a top plan view of the MZI 131 of this embodiment. The MZI 131 includes an input side coupler 132 and an output side coupler 133. Between the input side coupler 132 and the output side coupler 133, two arm waveguides 134 are formed by branching off the optical waveguide 120. Each coupler used in the MZI 131 may adopt any configuration. For example, a directional coupler, a Y branch, and the like are applicable.

Each of the arm waveguides 134 is provided with a high-frequency electrode 135 to which high-frequency power is to be applied, and ground electrodes 136 to be grounded are provided between the adjacent arm waveguides 134. Each high-frequency electrode 135 is connected to a high-frequency power supply through the corresponding input electrode 170a and the corresponding input electric wire 170b, and to a terminal substrate through the corresponding terminal electrode 180a and the corresponding terminal electric wire 180b.

Furthermore, a direct-current electrode 137 is provided on the input side of each MZI 131 in order to apply a constant voltage so as to adjust an interference characteristic of the relevant MZI 131. The direct-current electrodes 137 are connected to a direct-current power supply through not-illustrated electric wiring.

Figure 2B:
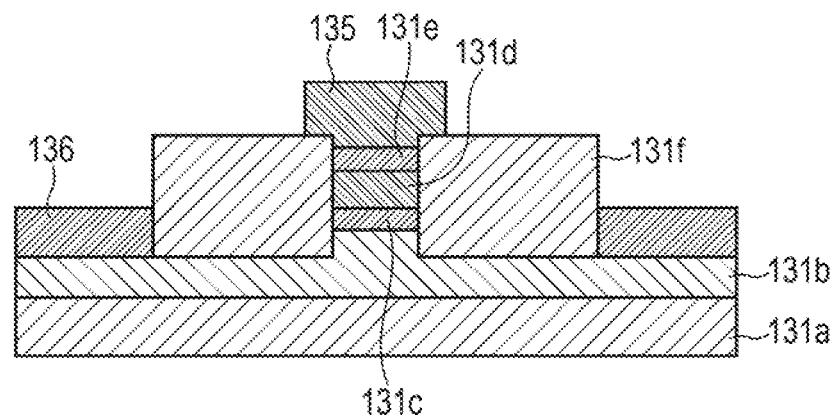
FIG. 2B is a cross-sectional view of the Mach-Zehnder interferometer according to an embodiment of the present invention.

FIG. 2B is a cross-sectional view of the MZI 131 viewed along the line B-B in FIG. 2A. The MZI 131 has a structure in which a lower clad layer 131b made of n-InP, an active layer 131c made of AlGaInAs/AlInAs and having a multiple quantum well structure (MQW), an upper clad layer 131d made of p-InP, and a contact layer 131e made of p-InGaAs are sequentially stacked on an InP substrate 131a. A region from the upper clad layer 131d to part of the lower clad layer 131b constitutes a high mesa structure in which a mesa shape is formed in such a way as to penetrate the active layer 131c. Two sides of the high mesa structure are covered with an insulating resin 131f and a not-illustrated passivation film made of SiNx. Here, the active layer 131c constitutes a core layer in a waveguide structure, and a width of the active layer 131c is almost constant throughout in its length direction. Meanwhile, the high-frequency electrode 135 is formed on the contact layer 131e, and a ground electrode 136 is formed on the lower clad layer 131b beside the active layer 131c.

When the high-frequency power is applied to the high-frequency electrode 135, a refraction index of the active layer 131c having the multiple quantum well structure is changed by the quantum-confined Stark effect (QCSE). Accordingly, this change brings about a change in phase difference of light passing through the active layers 131c of the two arm waveguides 134, thereby changing interference at the output side coupler 133 of the MZI 131. In this configuration, it is possible to switch the presence or absence of the light output from the MZI 131 by controlling the application of the high-frequency power to the high-frequency electrodes 135, and thus to perform light modulation.

The configuration of the MZI 131 shown in FIGS. 2A and 2B is just an example. The MZI 131 may apply any configuration which can modulate the optical signal by means of voltage application.

In this embodiment, as shown in FIG. 1, while positions on the input side of the four MZIs 131 are aligned with one another, a length of two of the MZIs 131 is different from a length of the remaining two MZIs 131. As shown in FIG. 2A, the direct-current electrode 137 is provided on the input side of each MZIs 131. Accordingly, when the multiple MZIs 131 with the equal length are arranged in parallel, there may be a case in which the direct-current electrode 137 stands in the way when arranging the input electric wires 170b from the high-frequency electrodes 135 and the ground electrodes 136. On the other hand, in this embodiment, the positions on the input side of the multiple MZIs 131 are aligned with one another while the lengths thereof are changed at the same time. Accordingly, the arrangement of the input electric wires 170b is facilitated by expanding regions between the direct-current electrodes 137 arranged on the input side of the MZIs 131 and the high-frequency electrodes 135 as well as the ground electrodes 136.

Furthermore, in this embodiment, all the input electric wires 170b are arranged to have an equal length as shown in FIG. 1. The equality of the lengths of the input electric wires 170b includes not only a state of the line lengths in strict accordance, but also a state of keeping a difference in line width among the input electric wires 170b to 1 mm at a maximum. By the above-described configuration, it is possible to match the timing of the high-frequency power to be applied to the high-frequency electrodes 135 of the respective MZIs 131, and thus to improve modulation accuracy.

Figure 3:
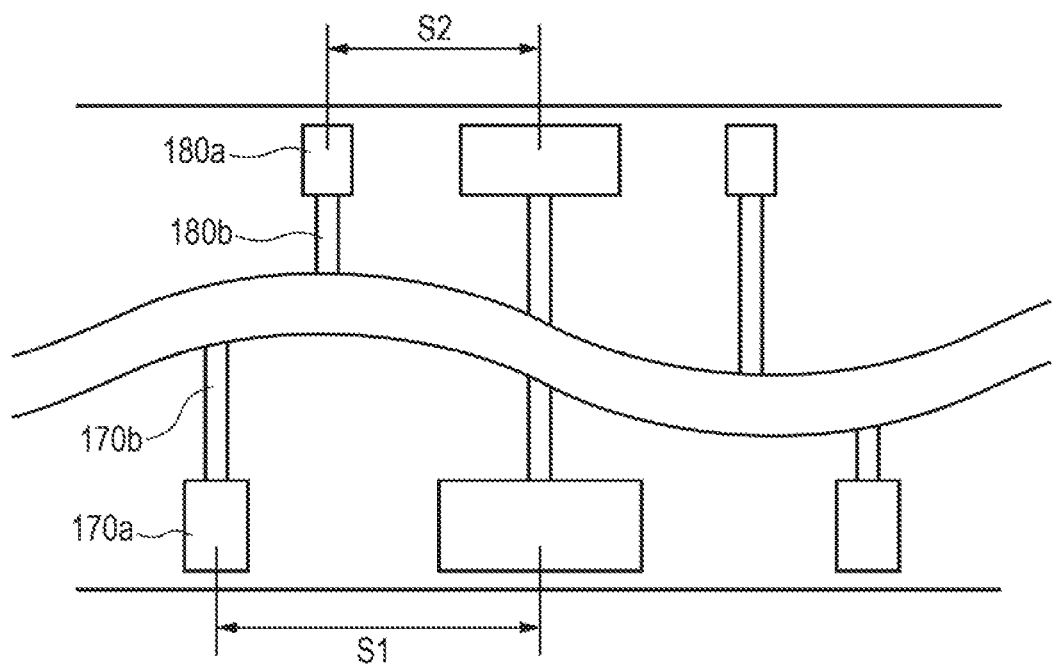
FIG. 3 is an enlarged top plan view showing a region including input electrodes and terminal electrodes of the optical modulator according to an embodiment of the present invention.

FIG. 3 is an enlarged top plan view showing a region including the input electrodes 170a and the terminal electrodes 180a of the optical modulator 100. In order for the optical modulator 100 to perform accurate modulation, it is particularly desirable to reduce interference between the input electric wires 170b by increasing an interval therebetween. In the related art, there was a large constraint on the layout as the input electric wires 170b and the terminal electric wires 180b were arranged in the same region, and it was therefore necessary to make the entire substrate 190 larger in order to prevent the interference by spreading the intervals between the input electric wires 170b. On the other hand, in this embodiment, the terminal electrodes 180a and the terminal electric wires 180b are arranged between the two ends of the U-shaped optical waveguide 120, and the input electrodes 170a are arranged on the curved portion side of the U-shaped optical waveguide 120. Due to the above-described configuration, none of the input and output units of the optical waveguide 120, the terminal electrodes 180a, and the terminal electric wires 180b are arranged on the curved portion side of the U-shaped optical waveguide 120. Accordingly, it is possible to secure a large region to arrange the input electrodes 170a and the input electric wires 170b without having to make the entire substrate 190 larger. For this reason, it is possible to set the intervals between the input electrodes 170a larger than the intervals between the terminal electrodes 180a, and to spread the intervals between the input electric wires 170b accordingly. To be more precise, as shown in FIG. 3, the input electrodes 170a and the terminal electrodes 180a are arranged such that a distance S1 between the centers of the adjacent input electrodes 170a is larger than a distance S2 between the centers of the adjacent terminal electrodes 180a. Here, it is to be noted that the sizes of the adjacent input electrodes 170a and the sizes of the adjacent terminal electrodes are different because the signal electrodes and the grounding electrodes are alternately arranged.

Figure 4:
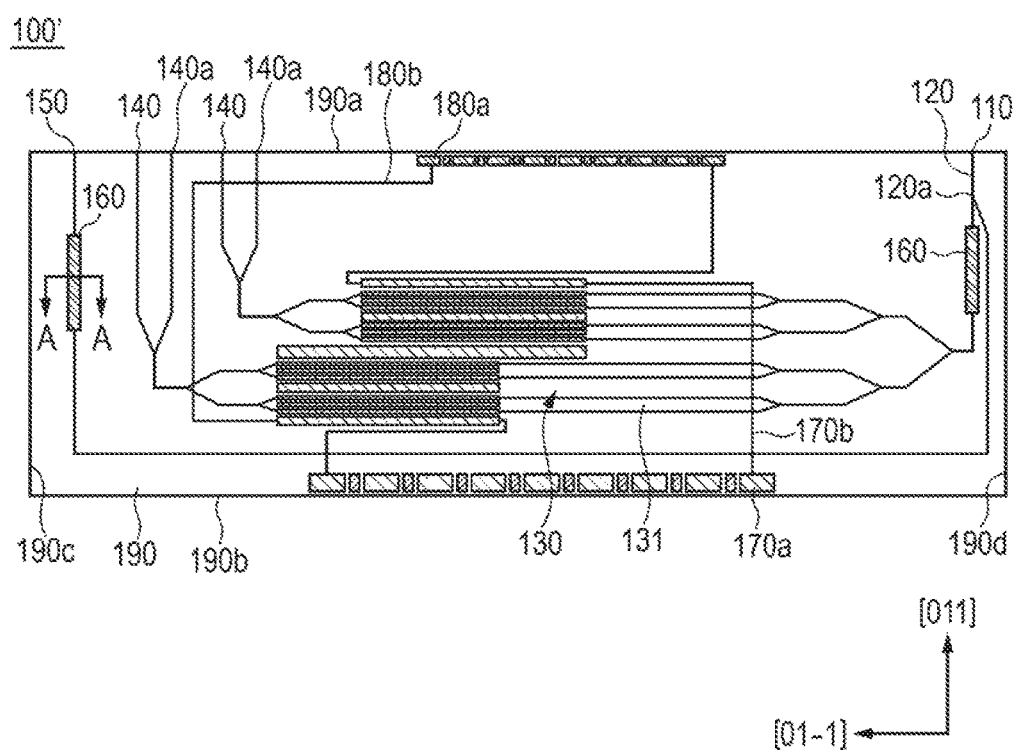
FIG. 4 is a top plan view of an optical modulator according to an embodiment of the present invention.

The optical modulator 100 of this embodiment may be configured to further output local oscillation light L3 (LO light) in addition to the signal light L2a and L2b, and a semiconductor optical amplifier (SOA) may further be provided on the substrate 190. FIG. 4 is a top plan view of an optical modulator 100', which is capable of outputting the LO light and is provided with the SOA. In FIG. 4, [011] orientation and [01-1] orientation of the substrate 190 are indicated with arrows. Regarding the optical modulator 100', its configuration and functions are the same as those of the optical modulator 100 except for portions to be described below.

In the optical modulator 100', an LO light output unit 150 being a port for outputting the LO light L3 is provided on the first end surface 190a of the substrate 190, in addition to the signal light output units 140 being the ports for outputting the modulated signal light L2a and L2b The optical waveguide 120 extending from the optical input unit 110 is branched off into two line by a branching unit 120a. One of the lines is connected to the signal light output units 140 through the modulation unit 130 and the other line is connected to the LO light output unit 150. While a multimode interference (MMI) coupler is used as the branching unit 120a in this embodiment, a directional coupler, a Y branch, and the like may be used instead.

On the substrate 190, SOAs 160 to amplify inputted light and to output the amplified light are provided between the branching unit 120a and the input side of the modulation unit 130, as well as between the branching unit 120a and the LO light output unit 150, respectively. The provision of the SOAs 160 separately on a path for the signal light and a path for the LO light brings about an effect of a capability of controlling amplification of the light inputted to the modulation unit 130 and amplification of the LO light independently of each other. Moreover, it is possible to amplify the light immediately upstream of the modulation unit 130 and the light immediately upstream of the LO light output unit 150, respectively. Thus, attenuation of the light either after the amplification and before the input to the modulation unit 130, or after the amplification and before the output from the LO light output unit 150 can be suppressed, so that an amount of an electric current to be fed to each SOA 160 can be reduced.

Figure 5:
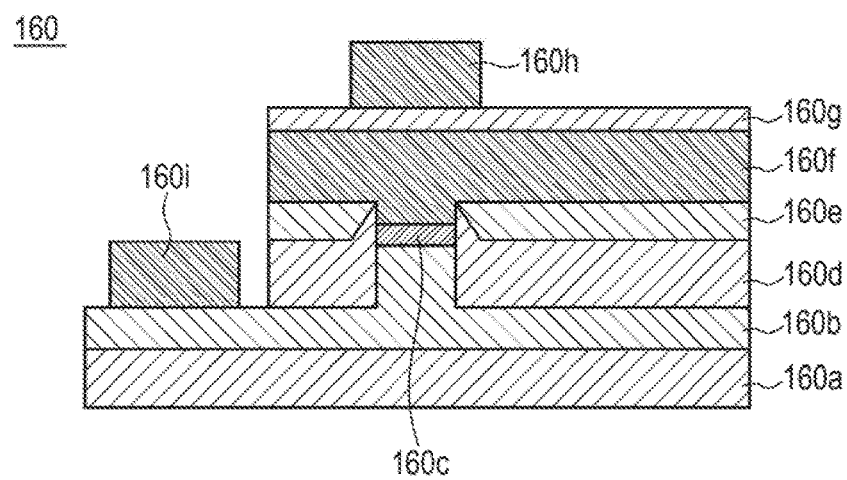
FIG. 5 is a cross-sectional view of a semiconductor optical amplifier according to an embodiment of the present invention.

FIG. 5 is a cross-sectional view of the SOA 160 viewed from the A-A line in FIG. 4. The SOA 160 has a structure in which a lower clad layer 160b made of n-InP, an active layer 160c made of InGaAsP and having a multiple quantum well-separate confinement heterostructure (MQW-SCH), an upper clad layer 160f made of p-InP, and a contact layer 160g made of p-InGaAs are sequentially stacked on an InP substrate 160a. A region from part of the lower clad layer 160b to the contact layer 160g constitutes a mesa structure. Here, two sides of the active layer 160c in the mesa structure are buried with a current blocking layer which includes a lower current blocking layer 160d made of p-InP and an upper current blocking layer 160e made of n-InP. Thus, a buried mesa waveguide structure is established. Here, the active layer 160c constitutes a core layer in the waveguide structure and a width of the active layer 160c is almost constant throughout in its length direction. Meanwhile, a p-electrode 160h is formed on the contact layer 160g, and an n-electrode 160i is formed on the lower clad layer 160b beside the active layer 160c.

When the SOA 160 is brought into an excited state by feeding a current between the n-electrode 160i and the p-electrode 160h and then the light is inputted from one end of the SOA 160, the SOA 160 guides and amplifies the light. The light thus amplified is outputted from the other end of the SOA 160.

The configuration of the SOA 160 shown in FIG. 5 is just an example. The SOA 160 may apply any configuration which can amplify the optical signal by means of electric power application.

Each SOA 160 and the modulation unit 130 are arranged such that an extending direction (a mesa direction) of the optical waveguide constituting the SOA 160 and an extending direction (a mesa direction) of the optical waveguide constituting the MZI 131 of the modulation unit 130 are perpendicular to each other. To be more precise, the extending direction of the active layer 160c in the SOA 160 is set to a dire ion parallel to the [011] orientation of the substrate 190, which is a direction to facilitate the burying of the sides of the active layer 160c with the lower current blocking layer 160d and the upper current blocking layer 160e. In the meantime, the extending direction of the MZI 131 of the modulation unit 130 is set to a direction parallel to the [01-1] orientation of the substrate 190, which is a direction to enhance modulation efficiency of the MZI 131 by increasing a change in refractive index thereof. Here, the [011] orientation of the substrate 190 is perpendicular to the [01-1] orientation thereof. As a consequence of the above-described arrangement, it is possible to enhance productivity of the SOAs 160 and characteristics of the modulation unit 130 at the same time. In this embodiment, the optical waveguide 120 is arranged in the U-shape. Thus, it is possible to achieve the above-described arrangement of the SOAs 160 and the modulation unit 130 particularly easily.

In the optical modulator 100', the modulation unit 130 and the SOAs 160 are monolithically integrated i.e., provided on the same substrate 190. In the related art such SOAs 160 would often be provided together with a laser light source. In this case, a temperature adjustment unit such as a heater and a cooler is provided in order to adjust a wavelength of the laser light source. On the other hand, the temperatures of the SOAs 160 need to be controlled separately. Hence, it is necessary to provide temperature adjustment units for the SOAs 160 separately from the temperature adjustment unit for the laser light source. In contrast, the modulation unit 130 and the SOAs 160 are monolithically integrated in this embodiment. Accordingly, it is possible to locate the SOAs 160 away from a heat source, and thus to reduce power consumption, costs, and the area for arrangement, which would be required by the temperature adjustment units for the SOAs 160.

Second Embodiment

In the first embodiment, the laser light source is provided separately from the optical modulator. Meanwhile, in this embodiment, a laser light source and the optical modulator are monolithically integrated on the same substrate.

Figure 6:
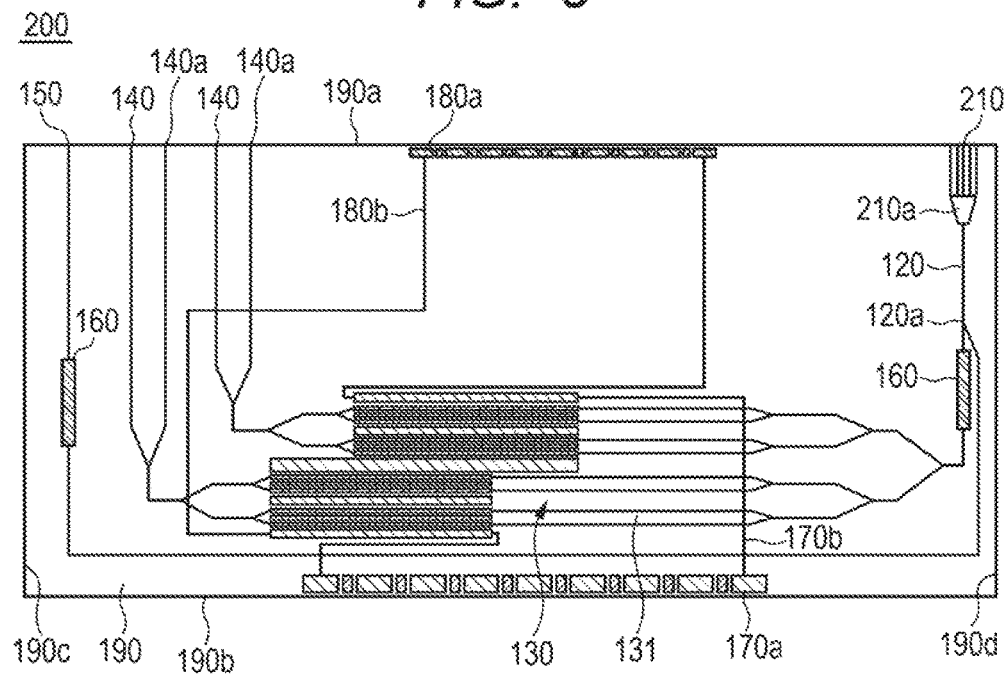
FIG. 6 is a top plan view of an optical modulator according to an embodiment of the present invention.

FIG. 6 is a top plan view of an optical modulator 200 of this embodiment. This embodiment is different from the first embodiment in that a laser oscillation unit 210 is provided instead of the optical input unit 110, and other portions are the same as the configuration of the optical modulator 100 shown in FIG. 1. The laser oscillation unit 210 is provided on the substrate 190 and is connected to the optical waveguide 120 through an optical coupler 210a. Any laser oscillation unit such as a distributed feedback (DFB) laser array may be used as the laser oscillation unit 210. A temperature adjustment unit for adjusting the temperature of the laser oscillation unit 210 is preferably provided in the vicinity of the laser oscillation unit 210. Any optical coupler such as an MMI coupler, an arrayed waveguide grating (AWG) coupler, and a star coupler may be used as the optical coupler 210a. The laser oscillation unit 210 outputs the seed light L1, and the seed light L1 is branched off by the branching unit 120a and subjected to the prescribed amplification and modulation as with the first embodiment.

According to the above-described configuration, it is possible to further reduce the size of an optical transmitter and an optical transceiver each of which includes the optical modulator. In addition, since the laser oscillation unit 210 and the modulation unit 130 are located at a short distance, attenuation of the seed light L1 is reduced so chat strength and an amplification factor of the laser can be reduced.

Third Embodiment

Figure 7:
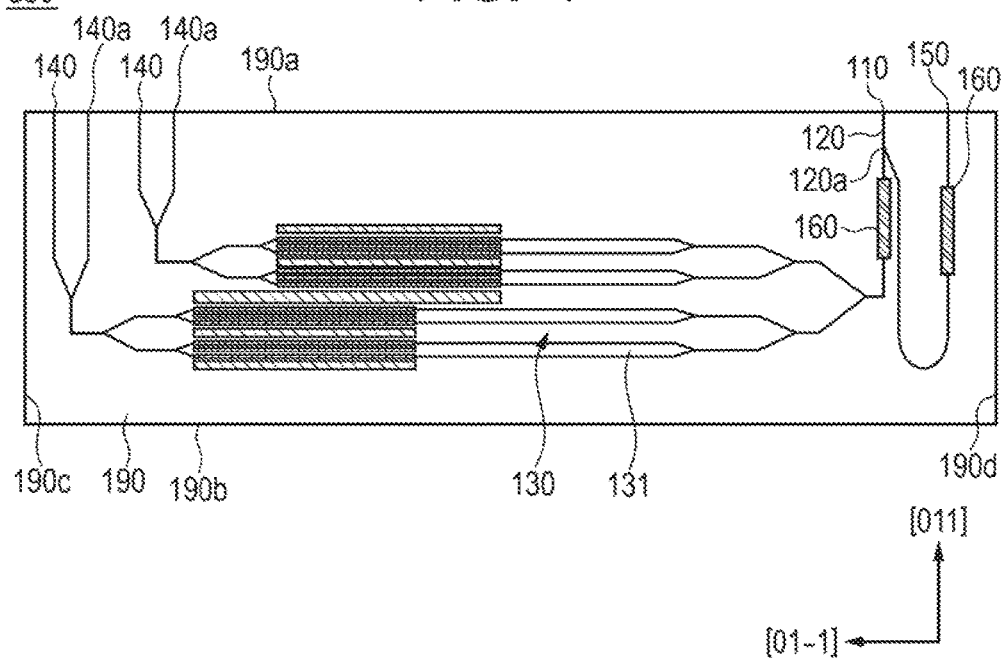
FIG. 7 is a top plan view of an optical modulator according to an embodiment of the present invention.

FIG. 7 is a top plan view of an optical modulator 300 of this embodiment. A layout of the optical input unit 110, the signal light output units 140, and the LO light output unit 150 of the optical modulator 300 is different from that of the optical modulator 100' of the first embodiment shown in FIG. 4 and the rest of the configuration and functions are the same as those of the optical modulator 100'. Note that the illustration of the input electrodes 170a, the terminal electrodes 180a, and the electric wires connected thereto is omitted in FIG. 7 for the sake of visibility.

In the optical modulator 300, on the first end surface 190a of the substrate 190, the optical input unit 110 is provided between the signal light output units 140 and the LO light output unit 150. Specifically, the optical input unit 110, the signal light output units 140, and the LO light output unit 150 are arranged on the same end surface of the substrate 190. In addition, the signal light output units 140 and the LO light output unit 150 are arranged in such a way as to put the optical input unit 110 in between. As with the first embodiment, the above-described configuration makes it possible to reduce the size of a package, and to obtain a favorable high-frequency characteristic by reducing noises.

The present invention is not limited only to the above-described embodiments but may be modified as appropriate within the scope not departing from the gist of the invention.

The invention claimed is:

1. An optical modulator comprising:
a substrate;
an optical waveguide provided on the substrate and configured to guide light;
a modulation unit formed of part of the optical waveguide and configured to modulate the light; and
electric wiring provided on the substrate and configured to supply a high-frequency electric signal to the modulation unit, wherein
one end portion for optical input and another end portion for optical signal output of the optical waveguide are provided on a first end surface of the substrate,
one end portion of the electric wiring is provided along the first end surface,
another end portion of the electric wiring is provided along a second end surface of the substrate being different from the first end surface,
the optical waveguide includes
a first portion provided on a side of the optical input extending from the one end portion of the optical waveguide in a direction perpendicular to the first end surface,
a second portion provided on a side of the optical signal output extending from the another end portion of the optical waveguide in the direction perpendicular to the first end surface, and
a third portion extending between the first portion and the second portion in a direction parallel to the first end surface, and
the modulation unit is provided at the third portion.

2. The optical modulator according to claim 1, wherein
the one end portion of the electric wiring forms an electrode on a terminal side,
the another end portion of the electric wiring forms an electrode on an input side, and
the electrode on the terminal side is provided between the one end portion and the another end portion of the optical waveguide.

3. The optical modulator according to claim 2, wherein
the optical modulator includes a plurality of the electrodes on the input side and a plurality of the electrodes on the terminal side, and
an interval between the electrodes on the input side is larger than an interval between the electrodes on the terminal side.

4. The optical modulator according to claim 1, wherein the first end surface and the second end surface of the substrate are opposed to each other.

5. The optical modulator according to claim 1, wherein the modulation unit includes a Mach-Zehnder interferometer formed of part of the optical waveguide.

6. The optical modulator according to claim 1, further comprising:
a semiconductor optical amplifier formed of part of the optical waveguide and configured to amplify the light.

7. The optical modulator according to claim 6, wherein a direction along the optical waveguide in the modulation unit and a direction along the optical waveguide in the semiconductor optical amplifier are perpendicular to each other.

8. The optical modulator according to claim 1, further comprising:
   a laser oscillation unit provided on the substrate and configured to emit the light.

9. The optical modulator according to claim 1, wherein
   the another one end portion of the optical waveguide is branched off and formed into a first end portion for the optical input and a second end portion for local oscillation light output, and
   the waveguide first end portion is provided between the first another end portion and the second end portion on the first end surface.

\* \* \* \* \*